United States Patent [19]

Best

[11] Patent Number: 5,393,070

[45] Date of Patent: * Feb. 28, 1995

[54] TALKING VIDEO GAMES WITH PARALLEL MONTAGE

[76] Inventor: Robert M. Best, 777 108th Ave. N.E., #2460, Bellevue, Wash. 98004

[*] Notice: The portion of the term of this patent subsequent to Oct. 25, 2011 has been disclaimed.

[21] Appl. No.: 57,945

[22] Filed: May 5, 1993

Related U.S. Application Data

[63] Continuation-in-part of Ser. No. 614,843, Nov. 14, 1990, abandoned, and a continuation-in-part of Ser. No. 756,356, Sep. 9, 1991, abandoned.

[51] Int. Cl.⁶ ............................................. A63F 9/22
[52] U.S. Cl. ................................................. 273/434
[58] Field of Search ............... 273/434, 435, 437, 438, 273/DIG. 28, 85 G

[56] References Cited

U.S. PATENT DOCUMENTS

| | | |
|---|---|---|
| 4,305,131 | 12/1981 | Best . |
| 4,333,152 | 6/1982 | Best ..................................... 364/521 |
| 4,445,187 | 4/1984 | Best ..................................... 364/521 |
| 4,569,026 | 2/1986 | Best ..................................... 364/521 |

OTHER PUBLICATIONS

Best: Movies That Talk Back, IEEE Transactions on Consumer Electronics, vol. CE-26, Aug. 1980.
Monaco, How to Read a Film, section on Montage pp. 183-192, Oxford Univ. Press, NY, 1977.
Wayne and Shiner, Time Has Come Today, Time Masters chapter 3 of 8, pp. 2-5, DC Comics Inc, NY, Apr. 1990.

Primary Examiner—Jessica J. Harrison
Attorney, Agent, or Firm—Graybeal Jackson Haley & Johnson

[57] ABSTRACT

Talking video games can provide simulated voice dialogs between human players and animated characters on a video screen. When two or more characters are in two different scenes, the animated picture may alternate between the two scenes to give an illusion that the actions in both scenes are happening simultaneously. A character in one scene talks with a character in the other scene who then may talk back. Each scene branches to two or more subsequent scenes. But within each scene there are several branching dialog sequences, thereby providing a large variety of possible dialogs. Scenes are separated in space or in time. The characters may be shown talking with each other through a voice communication apparatus such as a telephone or two-way radio or through an opening in a wall such as a window or door. Each player has a hand-held controller that displays two or more phrases or actions. A player responds by pressing a button next to a selected phrase or action. An animated character then acts or verbally responds as if it had been spoken to by the human player or by one of the other characters. Speech recognition is not required.

6 Claims, 7 Drawing Sheets

FIG. 3
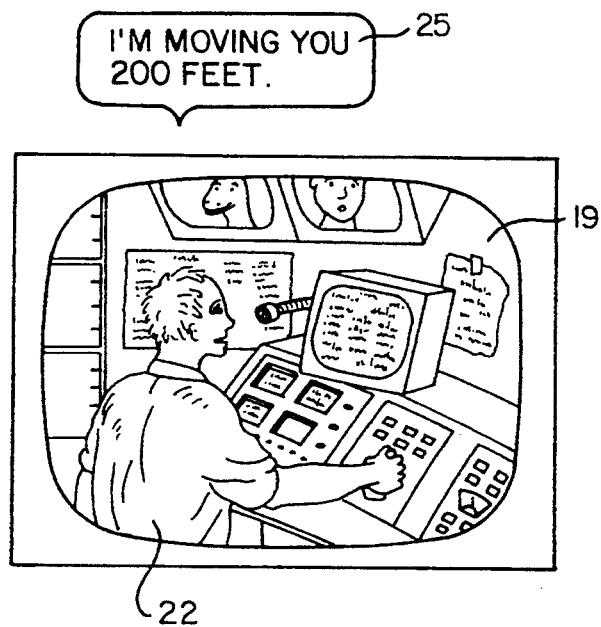
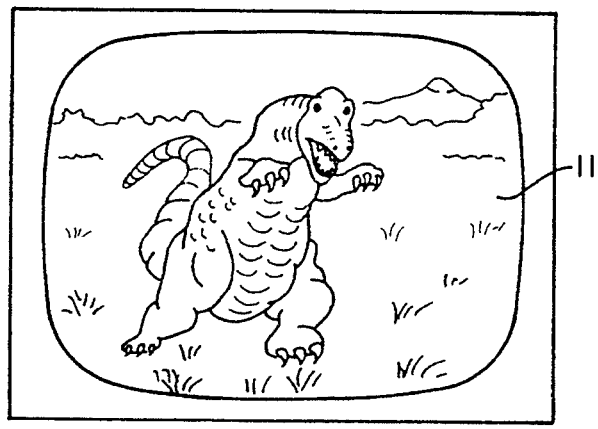

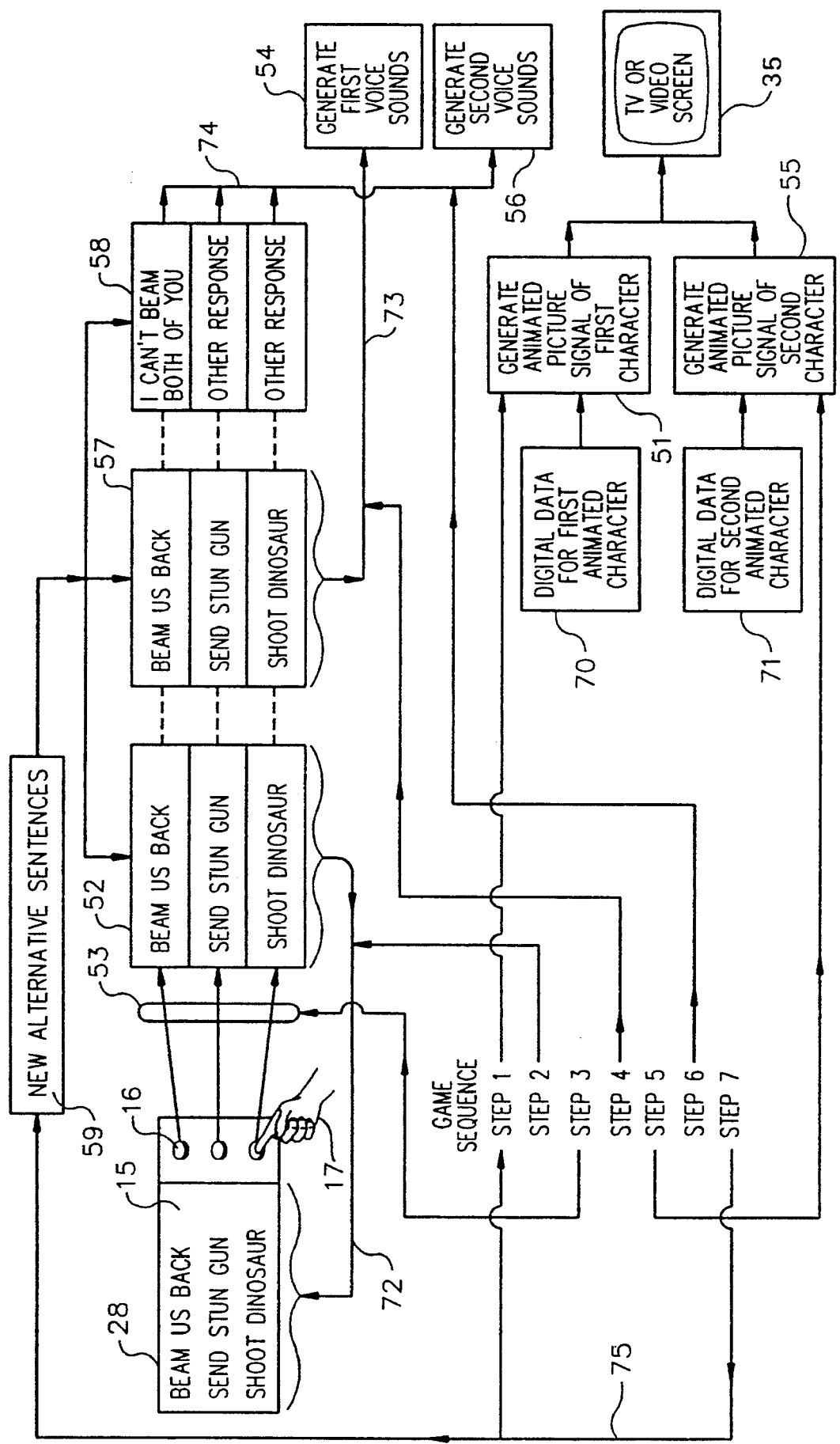

TALKING VIDEO GAMES WITH PARALLEL MONTAGE

CROSS REFERENCE TO RELATED APPLICATIONS

This is a continuation-in-part of U.S. patent application Ser. No. 07/614,843, filed Nov. 14, 1990, abandoned in favor of continuation application Ser. No. 08/140,266, filed Oct. 21, 1993, pending, and a continuation-in-part of U.S. patent application Ser. No. 07/756,356, filed Sep. 9, 1991, abandoned.

TECHNICAL FIELD OF THE INVENTION

This invention relates to video games, animated cartoons, and human/machine interaction.

BACKGROUND OF THE INVENTION

Video games have some of the characteristics of motion picture film animation. In film terminology the editing together of several shots in a sequence to have a desired effect is called montage. There are several kinds of montage. Parallel montage is alternately cross-cutting between two shots or scenes to provide an illusion of simultaneity. For example, in a chase scene the montage alternates between shots of pursuer and pursued. This illusion of simultaneity is important if characters in different scenes are talking with each other on a telephone, two-way radio, or through a door, or if one character is distantly influenced by a character in another scene, either by hearing what the other character says or by watching what the other character does in the other scene. For example, a character in one scene may be watching another character through a window or on a television monitor or the like and thus be influenced by what the other character says or does.

In the video game art different scenes often alternate. For example, when a character goes through a door, a new scene may appear on the screen. It is also well known for video characters to talk to each other.

It is well known for human players to input choices using any of a variety of input devices such as push buttons, rotatable knobs, pressure sensitive membrane, proximity sensitive pads or screen overlay, light pen, light sensitive gun, joy stick, mouse, track ball, moving a cursor or crosshairs or scrolling through highlighted options, icons, speech recognition, etc.

In the prior art, each choice by the human can be immediately followed by a synthesized voice or digitized voice recording that speaks the words selected by the human player, so the human will quickly adjust to the fact that the spoken words he hears for his side of the dialog are initiated by his fingers rather than his vocal cords.

The characters in prior-art video games and computer games, especially role-playing games, are of two types: player-controlled characters (or player characters) and non-player characters. A player-controlled character is a human player's animated counterpart and does and says what the human player chooses to have him do and say. Non-player characters do only their pre-programmed actions and speak their fixed words. However, non-player characters can be indirectly influenced by a human player, either by responding to an action selected by the human or by responding to what a player-controlled character does or says.

SUMMARY OF THE INVENTION

This is a type of video game that simulates dialog between a human game player and two or more animated characters that are in different scenes on a video screen. The characters talk with each other and to a human game player or players who use hand-held controllers to select some of what is to be said or done. Branching is of two kinds: scene branching that results from a selected action or a change from one character to another and dialog branching within each scene.

BRIEF DESCRIPTION OF THE DRAWINGS

FIG. 3 illustrates two scenes following the scene of FIG. 2 in which a third animated character acts in response to the verbal command from FIG. 2 followed by a scene illustrating the effect of the third character's action, i.e. a surprised dinosaur.

FIG. 7 is an apparatus block diagram illustrating flow of data and method steps to generate a cyclical game play with two animated characters.

DETAILED DESCRIPTION OF THE PREFERRED EMBODIMENT

Figure 1:
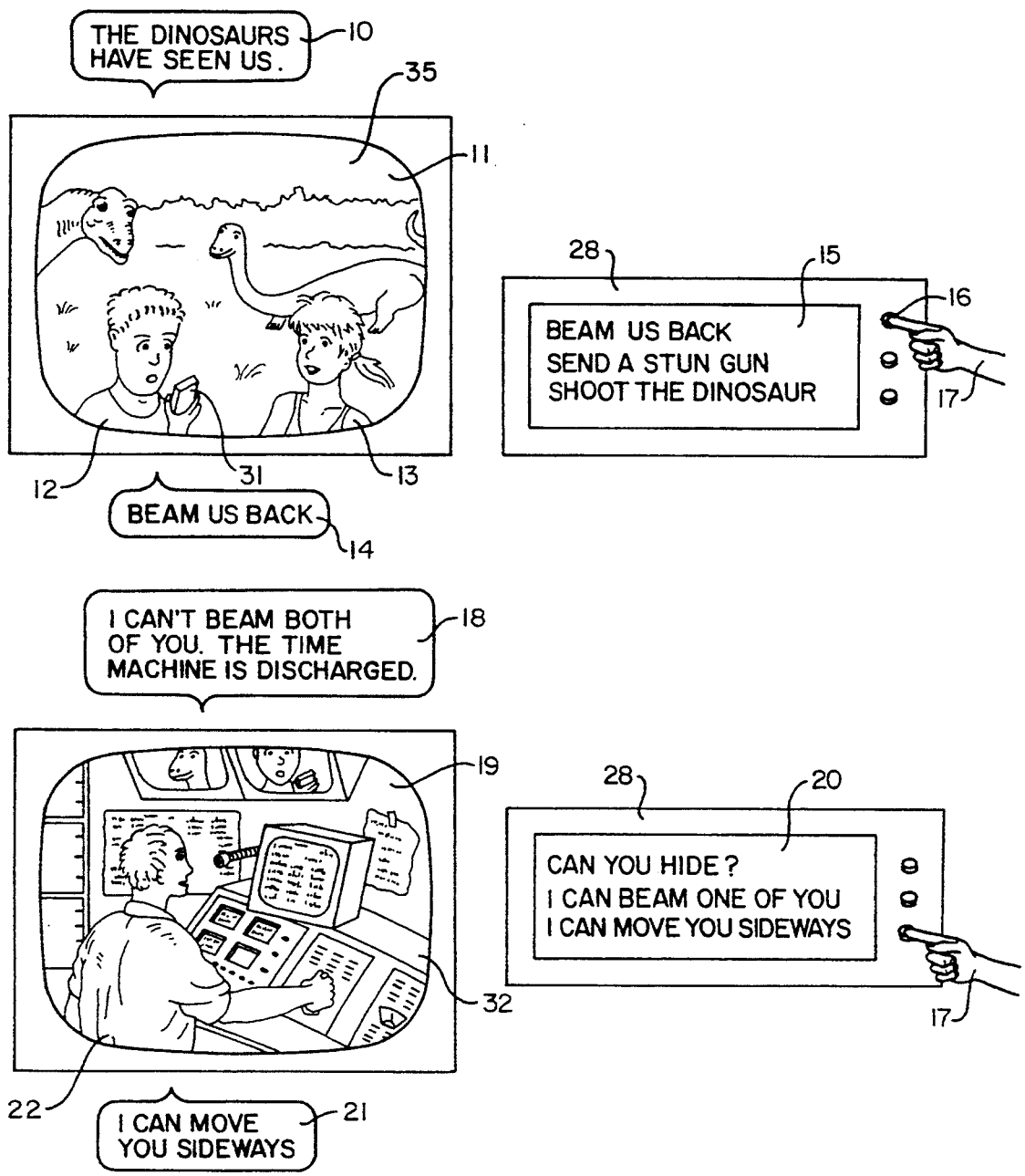
FIG. 1 illustrates two scenes of an animated cartoon talking game (in a time-travel setting) with two characters in one scene and one character in a second scene talking with each other through time using a radio-like device. One or more human players (hands shown pushing buttons) select some of what the characters say.

Referring to FIG. 1, in one embodiment of this invention a video game system displays on a TV or video screen an animated picture sequence to one or more human game players. Each human player holds a hand-held controller 28 having about three push buttons 16 next to a liquid-crystal display. Every few seconds alternative words, phrases, sentences or other verbal expressions 15 are displayed on controller 28 to give the human player a selection of things to "say" to animated characters or for the characters to say to each other or to human players. If a player's controller is lacking a liquid-crystal display, equivalent verbal expressions may be displayed on a TV or video screen and be manually selected by the human player pressing one or more push-buttons. Each time an animated character talks, his or her or its mouth should make appropriate speaking movements that are lip-synchronized with corresponding voice sounds.

The picture sequence on the video screen alternates between two distinctively different scenes to give an illusion that the actions in both scenes are happening simultaneously. Alternatively, the scenes may be displayed simultaneously in a split-screen arrangement. An animated character in one scene talks with an animated character in the other scene who may talk back to the first character. The two scenes are substantially separated in space (or in time in this example). A wall or equivalent separation device may be displayed to emphasize this scene separation. The characters, being separated in space in different scenes, are not able in this example to talk with each other "face to face." Instead they talk with each other through a voice communication apparatus such as a telephone or two-way radio or through an opening in a wall such as a window or door or tube or by way of an intermediary such as a human game player. Communication may be verbal or non-verbal but is usually spoken. Some communication may be written (for example by letter, poster, facsimile, smoke signals, etc). A character in one scene may look at a television monitor or through a window at an action performed by a character in a second scene and respond accordingly.

Dialog should branch, that is each multiple-choice selection by a human player of a sentence or phrase should lead to another multiple-choice selection of a sentence or phrase and that should lead to another, etc. A large variety of preprogrammed dialog sequences may thus provide a simulated voice conversation between one or more human players and two or more animated characters. Only a few such branches are illustrated in the drawing. During each scene the branching dialog with the character or characters may continue for dozens of branches in that scene, only some of which are directly controlled by a human player. In addition to branching dialog in each scene, a second kind of branching, scene branching results from a selected action or a change from one character to another that causes a shift from one scene to another. Branching dialog then proceeds in each new scene.

As the first scene 11 on video screen 35 begins, the video game system displays two animated characters 12 and 13 and nearby dinosaurs. Character 12 is talking into a hand-held radio-like device 31 to a third off-screen character 22 in another scene 19 to be subsequently displayed. Character 12 speaks the words "THE DINOSAURS HAVE SEEN US" into radio-like device 31. Controller 28 then displays to the human player three sentences 15 of alternative words that character 12 can say next. The human player's hand 17 is shown pressing button 16 to select the words "BEAM US BACK." The game system then generates the selected words in the voice sounds 14 of character 12 (indicated as a cartoon voice balloon for purposes of illustration).

The game system next displays scene 19 in which character 22 is an operator of a time-travel machine 32 which can communicate by voice and through time with character 12 in the dinosaur scene. Character 22 can watch characters 12 and 13 on video monitors or the like. Character 22 responds to the words "BEAM US BACK" with voice sounds 18 in the distinctive voice of character 22. Controller 28 then displays three new alternative sentences 20 that character 22 can say next. The human player presses the button to select the words "I CAN MOVE YOU SIDEWAYS." The game system then generates voice sounds 21 of character 22 saying the selected words.

Figure 2:
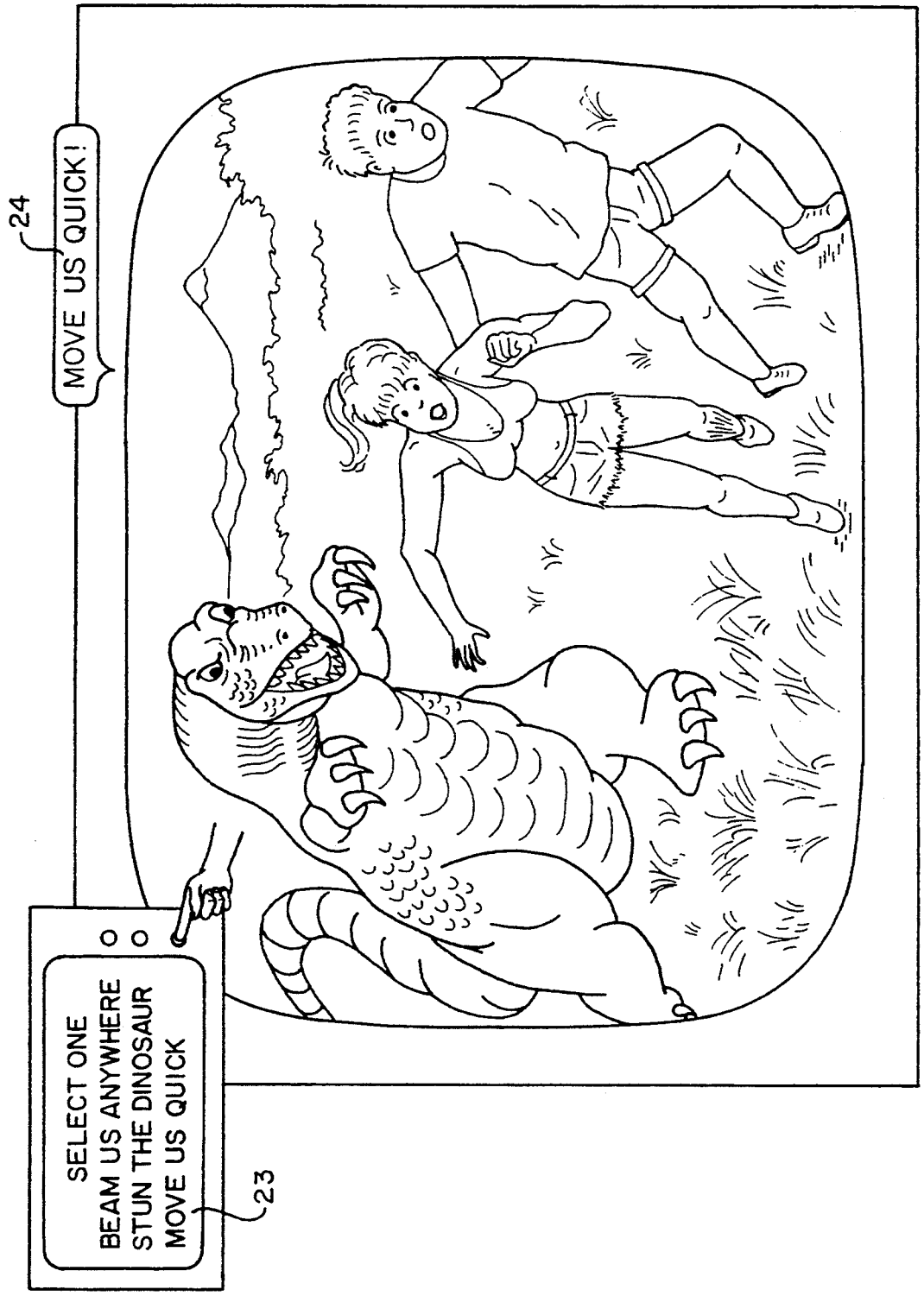
FIG. 2 illustrates the scene following FIG. 1 in which one of the animated characters responds to danger by giving a verbal command to an off-screen character, a command actually selected by a human player (hand shown pushing button).

Referring to FIG. 2, the display changes back to the dinosaur scene 11 in which character 12 and 13 are in acute danger and character 13 is ready to speak. The controller then displays three alternative sentences 23 she can say. The human player selects the words "MOVE US QUICK!" The game system then generates voice sounds 24 of character 13.

Referring to FIG. 3, the game system next displays time-machine scene 19 again in which character 22 responds to the FIG. 2 request with voice sounds 25. The game system then changes back to scene 11 in which the dinosaur is shown with a surprised expression on its face because characters 12 and 13 have just disappeared as a result of the action by character 22 in the other scene 19.

Figure 4:
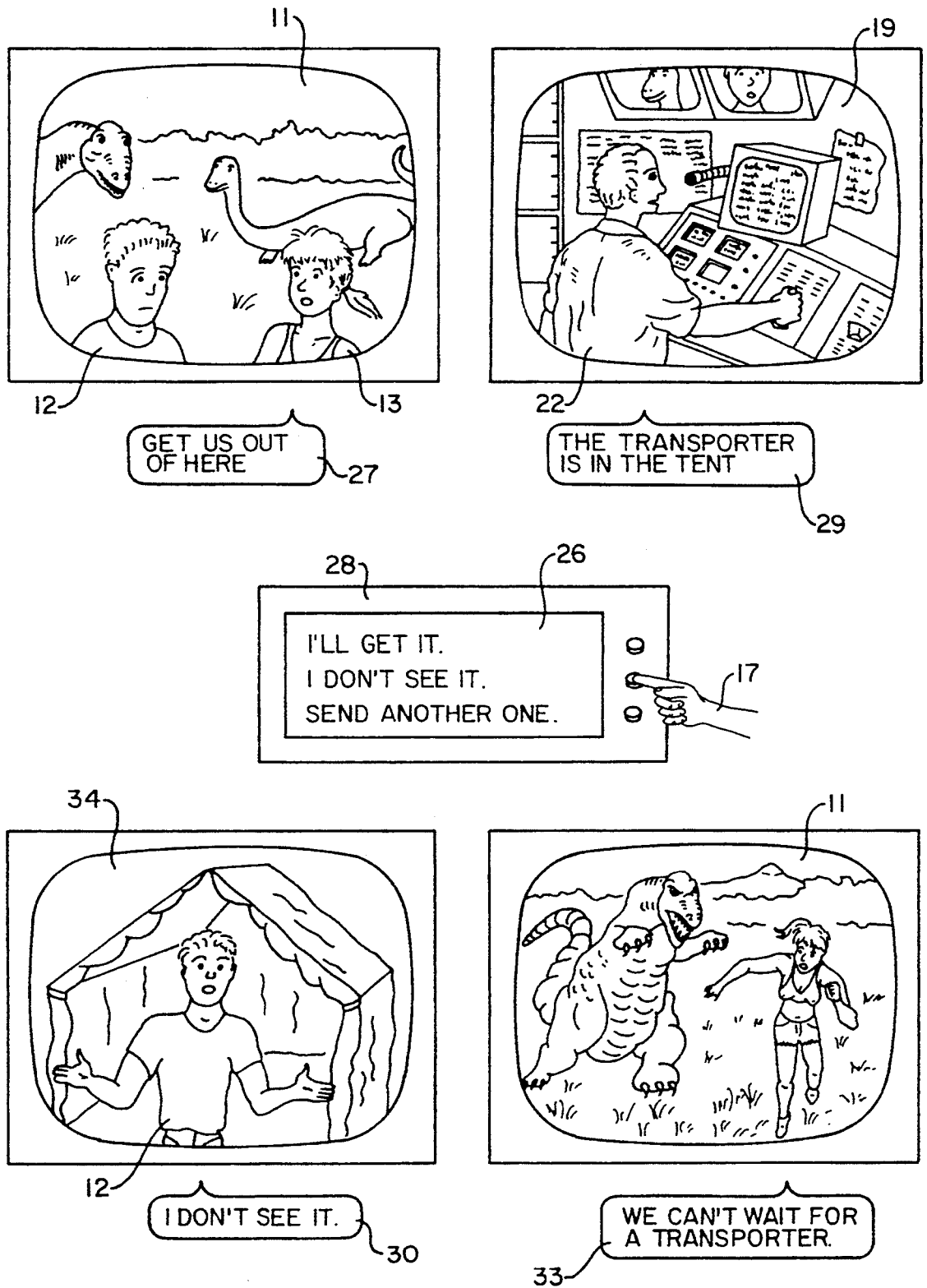
FIG. 4 illustrates three scenes and dialog between the three characters in the three scenes.

Referring to FIG. 4 which shows a different story line, the game system displays a sequence of three scenes in which a human player 17 acts as an intermediary between character 22 in the time-machine scene 19 and character 12 in a tent scene 34. In the first scene 11 of this sequence, the characters sense danger and character 13 requests help from character 22 in time-machine scene 19. The controller 28 then displays three alternative sentences for character 12 to say in tent scene 34. The human player 17 selects "I DON'T SEE IT." which character 12 then speaks as voice balloon 30. The game system then displays dinosaur scene 11 again where the danger has become acute for character 13 who speaks the words in balloon 33.

In these examples, character 12, 13 and 22 are player-controlled characters that the human player or players control. One or two or three human players may play the roles of the three animated characters. Non-player characters may also be used.

Figure 5:
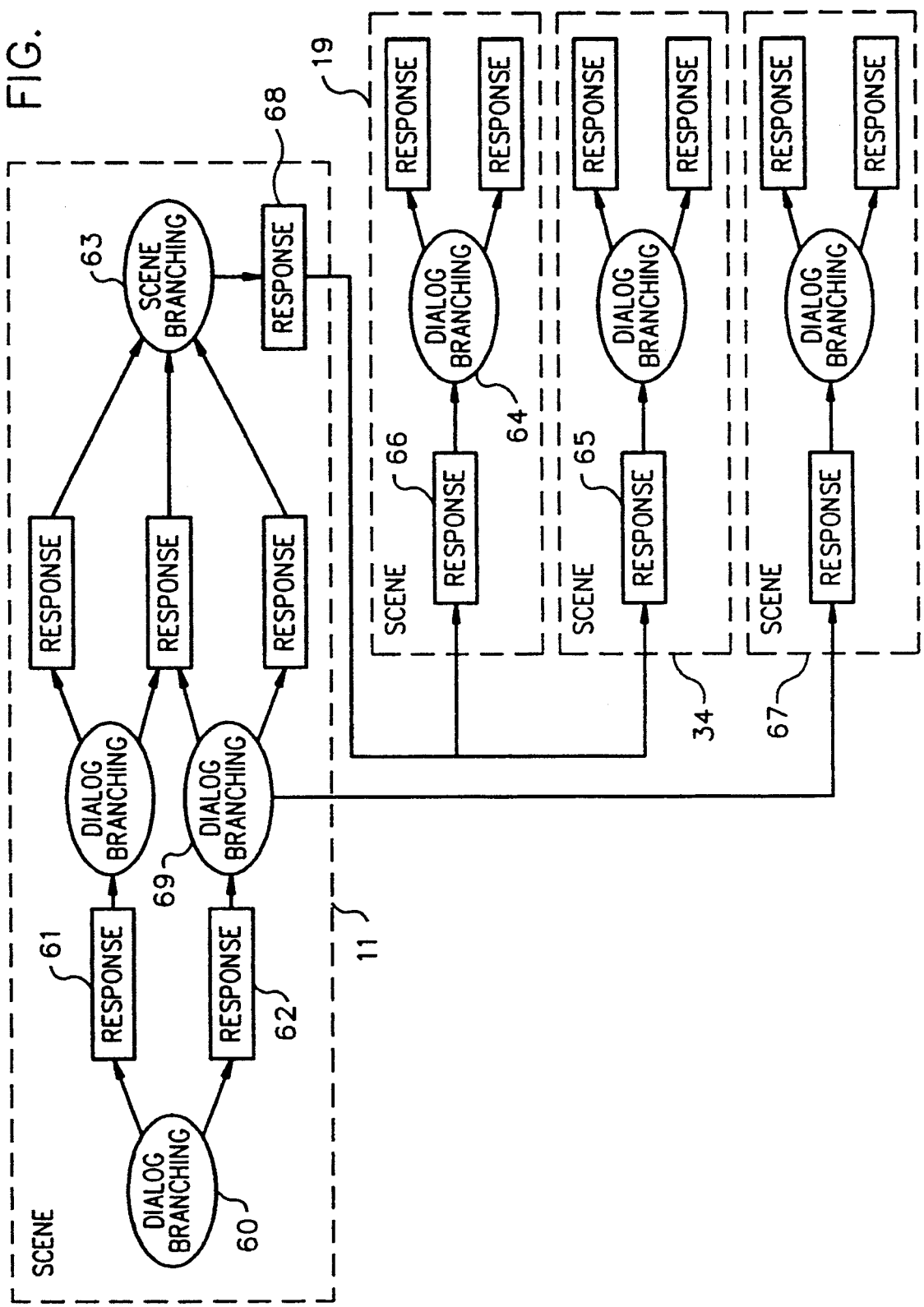
FIG. 5 is a flow diagram illustrating scene branching and dialog branching within each scene.

Referring to FIG. 5, a flowchart illustrates the distinction between branching dialog and branching scenes that are also shown in FIGS. 1–4. For example, in scene 11 (the dinosaur scene) dialog branch point 60 in FIG. 5 displays to the player two alternative verbal expressions to choose from. Each selection results in a different response 61 or 62 from one of the animated characters, but does not in this instance result in a scene change. However, the alternatives at branch point 63 will result in a scene change, either to time-machine scene 19 or to tent scene 34 as illustrated in FIGS. 4 and 5. Branch point 69 in FIG. 5 may result in either a scene change to scene 67 or a dialog branch depending on a player's choice. Scenes may alternate as illustrated in FIG. 4 and dialog branching may occur in each scene.

Selection by a human player of one action from a menu of alternative actions may cause a scene change. Branch point 63 that results in a scene change as a result of a selected action is illustrated in FIG. 2 where alternative sentences 23 offer player 17 alternative actions. Selection of one such action by player 17 results in the scene change illustrated in FIG. 3. If branch point 63 in FIG. 5 includes the alternative sentences 26 of FIG. 4, one of the branches leads to tent scene 34 which begins with response 65 that includes vocal response 30 in FIG. 4 and associated facial and hand movements.

Figure 6:
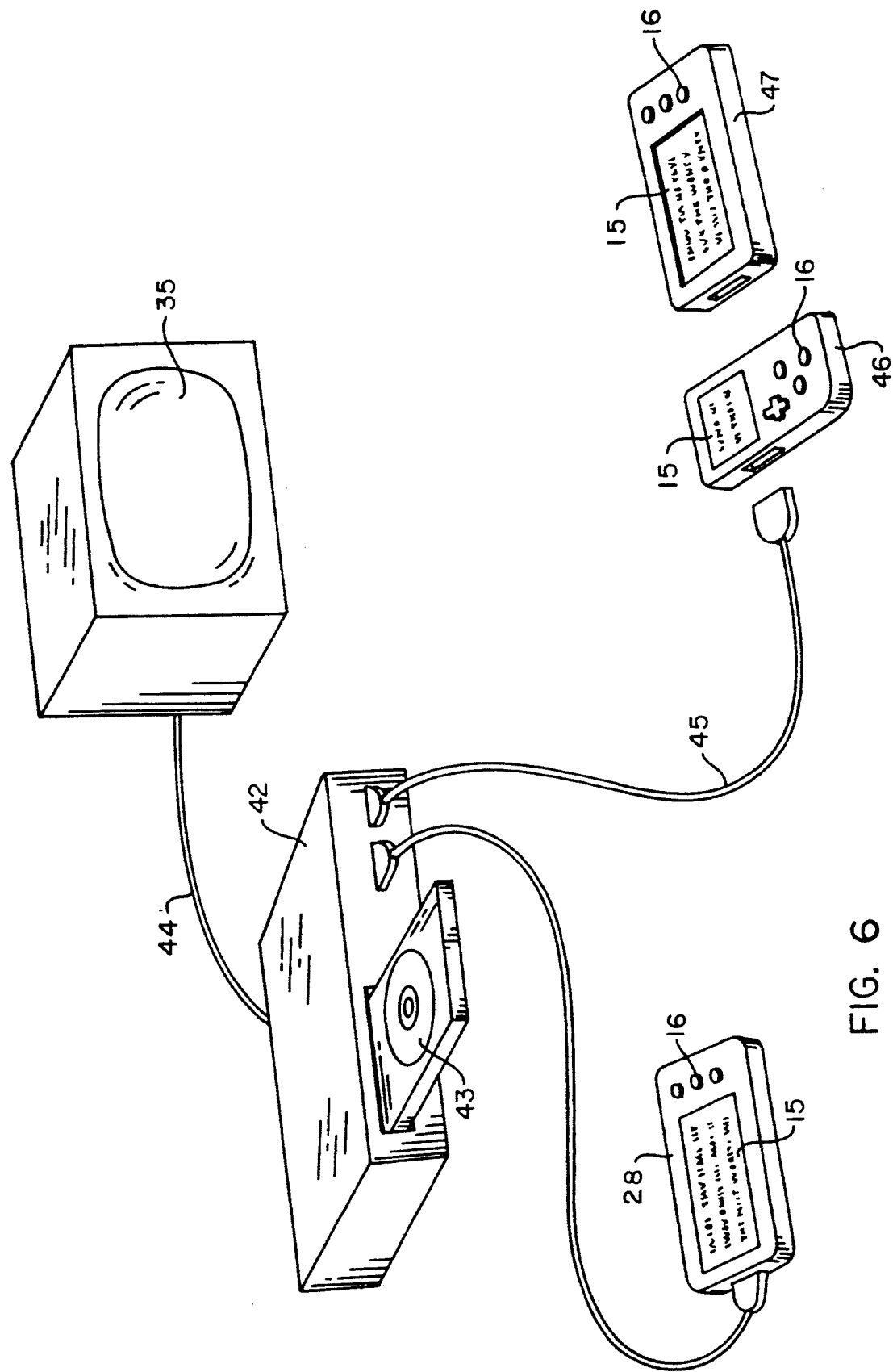
FIG. 6 is a pictorial view of a video game system having a CD-ROM disc drive connected to a TV set or video monitor with auxilary devices for displaying prompting words.

Referring to FIG. 6, video game system 42 is connected by cable 44 to a TV set or video screen 35 and to one or more hand-held control units 28 and 47 or portable game system 46, each having three push buttons 16 next to a liquid-crystal display 15. Infra-red or radio signals may be used instead of cables. System 42 includes a disk reader that reads digital data from a CD-ROM disk 43, or write-once disk or card or other medium containing digital data from which system 42 generates animated picture signals, compressed audio for voice and other sounds, synchronizing data, and words to display on units 28 and 47. Portable game system 46 with appropriate ROM program cartridge may substitute for units 28 and 47. Cable 45 connects game system 42 to display unit 28, 46 or 47 and transmits alternative prompting words or other verbal expressions for display. Cable 45 also transmits push-button 16 selection signals to system 42.

Referring to FIG. 7 which is a block diagram of a special-purpose apparatus for performing the video game illustrated in FIG. 1, the apparatus performs steps 1 through 7 in sequence, so that the picture sequence on the TV or video screen 35 alternates between two different scenes. In step 1, animated picture generator 51 generates a video or RF signal for display on video screen 35 of an animated picture from digitized animated character data stored in memory 70 of a first talking character in a first scene. In step 2, hand-held controller 28 displays several alternative sentences or other verbal expressions 15 via line 72 from memory 52 storing the alternative sentences. In step 3, one of the push buttons 16 generates a selection signal (indicated by one of lines 53) selecting a sentence from among the alternative sentences in memory 52 and also selects the corresponding (indicated by dotted lines) digitized voice recordings from memory 57 and 58. In step 4, voice signal generator 54 via line 73 generates a signal for output as first voice sounds from the selected digitized voice recording in memory 57 that expresses or responds to the words displayed on controller 28. In step 5, animated picture generator 55 generates a signal for display on video screen 35 of an animated picture from digitized animated character data stored in memory 71 of a second talking character in a second scene. In step 6, voice signal generator 56 generates a signal for second voice sounds from (via line 74) the selected digitized voice recording in memory 58 that respond to the words generated by voice signal generator 54. In step 7, a new set of alternative sentences from disk or memory 59 is loaded into memory 52, 57 and 58 and the sequence of steps begins again with step 1.

To allow each background scene to be used with different animated characters who can move around against the background scene, the digital animation data for the background scene should be stored separately from the digital animation data for each character. Similarly, to allow each character to say many different sentences without a scene change, the digitized voice data should be independent of the animation data. In the preferred embodiment, animated character video, voice sound sequences and prompting word sequences are generated independently from separately stored digital data. Dialog data that is not used in one scene may be used later in a different scene with the same or different characters. The voice data may consist of sequences of codes or compressed digital recordings of words, phrases, word segments or phonemes in several distinctive voices so that each character can speak thousands of preprogrammed words or sentences. Similarly, the digital data for each animated character's body may be stored separately from sprite data for moving lips, facial expressions, and gestures, so that each character and its distinctive voice can be lip-synchronized with different mouth movements depending on which branch the dialog takes. The digital data for each animated character may also combine body, lips, expressions, gestures and voice sounds.

The term "verbal expression" means any word, words, phrase, sentence, question, expletive, curse, keyword, combination of keywords, symbol, or any meaningful human voice sound such as "huh?" or "hmmm" or laughter or scream.

When a human player presses a button 16 of controller 28 the game system may generate voice sounds speaking the selected sentence or it may perform an action specified on controller 28. A button 16 selects a simulated verbal response to the previous words spoken by an animated character and also selects the new dialog sequence including the new alternative sentences that correspond to the selected simulated verbal response that was shown on controller 28. The selected dialog sequence that results includes the face and voice of the animated character speaking words which are responsive to the human player's selected verbal response.

The game system may generate a voice sound speaking the selected sentence as a substitute for the player's side of the dialog. The animated character then "responds" as if the generated voice sounds had been spoken by the human player. Because the player selects the words which are actually sounded, he will quickly adjust to the fact that the spoken words he hears for his side of the dialog are initiated by his fingers rather than his vocal cords. This echo voice is important for games with multiple human players so that each player will hear what each of the other players has "said" to on-screen characters. Pushing a button 16 selects both a simulated verbal response to the previous words spoken by an animated character and also selects a new dialog sequence that corresponds to the simulated verbal response shown on display 15. The selected dialog sequence includes the face and voice of the animated character speaking words which are responsive to the player's selected verbal response.

Alternatively, sub-titles may be used instead of echo voices and be displayed on a TV or video screen or on a hand-held display unit as a substitute for the player's side of the dialog.

If a voice communication apparatus is shown, a telephone or two-way radio or other voice communication apparatus may be substituted for radio-like device 31. A communication apparatus need not be shown. Various conversations between characters in two or more different scenes may also occur by characters speaking to each other through openings in a door, wall, roof, floor, car body or equivalent. The picture sequence need not explicitly show a wall or other scene separation device.

Each animated character can be an animated cartoon, digitized live action, analog live action, a sprite or the like, or a composite thereof, and be player controlled or not.

The word "scene" has been used herein to mean a sequence of video frames showing substantially the same location. The details and background of a scene may change as in scrolling, panning, scaling, rotation and zoom while remaining the same scene.

The time-travel story is given here only by way of example and may be replaced by other game stories that use parallel montage scenes. For example, a chase scene may parallel a phone-the-police scene in which a human game player talks with the good guy who is driving the car chasing the bad guy and also talks with another good guy left behind who is phoning the police from a phone booth. The police dispatcher scene may then alternate with the phone booth scene with the human player selecting words to say in this dialog. The police dispatcher scene may then alternate with the patrol car scene with a human player again selecting some of the dialog. By playing the role of an off-screen character the human player may act as an intermediary between the two parallel scenes. Another example is an accident scene in parallel with a going-for-help scene. These scenes are separated in space but are parallel in time. Again a human game player may act as an intermediary or as two player-characters that have dialog in their respective scenes with the victim in the accident scene and with the character who is going for help.

Two-way or three-way dialog may be combined with parallel montage in any combination. For example, character 12 may speak to character 13 who may speak to character 22 in another scene who may speak to character 12 or 13 in the first scene, with a human playing the role of any of the three characters by manually selecting words to say intermingled with selecting actions for a character to do. Likewise, character 13 may speak to character 22 in another scene who may speak to character 12 in the first scene who may speak to character 13. A human may also play the role of an off-screen character who speaks to character 22 who speaks to character 12 in another scene who speaks to character 13. Or a human player may speak to character 12 who speaks to character 13 who speaks to character 22 in another scene.

Although I have described the preferred embodiments of my invention with a degree of particularity, it is understood that the present disclosure has been made only by way of example and that equivalent steps and components may be substituted and design details changed without departing from the spirit and scope of my invention.

I claim:

1. A method of electronically simulating voice conversations between at least two talking animated characters, the words of one character being selected by a human player, comprising the steps of:
   (a) digitally storing a catalog of distinctive voices for at least two talking characters, each in the form of voice sound data representing a plurality of sentences, phrases, word segments or phonemes;
   (b) digitally storing a preprogrammed branching dialog between a first animated character and a second animated character, each branch comprising a plurality of alternative verbal expressions;
   (c) displaying on a hand-held controller apparatus a first set of alternatively selectable verbal expressions, each corresponding to a branch in said dialog;
   (d) receiving from said hand-held controller a manually initiated signal representing a selected verbal expression in said first set of verbal expressions, thereby selecting a branch in the dialog;
   (e) digitally reading from said catalog of voices first voice sound data that corresponds to said selected verbal expression for the voice of said first character;
   (f) generating a video signal representing an image of said first character for display on a video screen while said second character is off-screen;
   (g) generating an audio signal from said first voice sound data representing the voice of said first character speaking said selected verbal expression;
   (h) digitally reading from said catalog of voices second voice sound data for the voice of said second character speaking the verbal expression that follows next in the selected branch of the dialog;
   (i) generating a video signal representing an image of said second character for display on said video screen while said first character is off-screen;
   (j) generating an audio signal from said second voice sound data representing the voice of said second character;
   (k) displaying on said hand-held controller apparatus a second set of alternatively selectable verbal expressions that follows next for said first character in the selected branch of the dialog; and
   (l) generating a video signal representing an image of said first character for display on said video screen while said second character is off-screen.

2. The method of claim 1, wherein said characters are shown communicating with each other through communication apparatus.

3. The method of claim 1, wherein said hand-held controller is a portable game system with program cartridge.

4. The method of claim 1, wherein said video signal is changed to show moving lips on the character that is talking.

5. A method of electronically simulating voice conversations between at least two talking animated characters, the words of the characters being selected by two corresponding human players, comprising the steps of:
   (a) digitally storing a catalog of distinctive voices for at least two talking characters, each in the form of voice sound data representing a plurality of sentences, phrases, word segments or phonemes;
   (b) digitally storing a preprogrammed branching dialog between a first animated character and a second animated character, each branch comprising a plurality of alternative verbal expressions;
   (c) displaying on a first hand-held controller apparatus a first set of alternatively selectable verbal expressions, each corresponding to a branch in said dialog;
   (d) receiving from said first hand-held controller a manually initiated signal representing a first selected verbal expression in said first set of verbal expressions, thereby selecting a branch in the dialog;
   (e) digitally reading from said catalog of voices first voice sound data that corresponds to said first selected verbal expression for the voice of said first character;
   (f) generating a video signal representing an image of said first character for display on a video screen while said second character is off-screen;
   (g) generating an audio signal from said first voice sound data representing the voice of said first character speaking said first selected verbal expression;
   (h) displaying on a second hand-held controller apparatus a second set of alternatively selectable verbal expressions that follows next for said second character in the selected branch of the dialog;
   (i) receiving from said second hand-held controller a manually initiated signal representing a second selected verbal expression in said second set of verbal expressions, thereby selecting a next branch in the dialog;
   (j) digitally reading from said catalog of voices second voice sound data that corresponds to said second selected verbal expression for the voice of said second character;

(k) generating a video signal representing an image of said second character for display on said video screen while said first character is off-screen; and (l) generating an audio signal from said second voice sound data representing the voice of said second character speaking said second selected verbal expression.

6. A method of electronically simulating voice conversations between at least two talking animated characters, the words of the characters being selected by two corresponding human players, comprising the steps of:

(a) digitally storing a catalog of distinctive voices for at least two talking characters, each in the form of voice sound data representing a plurality of sentences, phrases, word segments or phonemes;

(b) digitally storing a preprogrammed branching dialog between a first animated character and a second animated character, each branch comprising a plurality of alternative verbal expressions;

(c) displaying on a first hand-held controller apparatus a first set of alternatively selectable verbal expressions, each corresponding to a branch in said dialog;

(d) receiving from said first hand-held controller a manually initiated signal representing a first selected verbal expression in said first set of verbal expressions, thereby selecting a branch in the dialog;

(e) digitally reading from said catalog of voices first voice sound data that corresponds to said first selected verbal expression for the voice of said first character;

(f) generating a video signal representing an image of said first character for display on a video screen while said second character is off-screen;

(g) generating an audio signal from said first voice sound data representing the voice of said first character speaking said first selected verbal expression;

(h) digitally reading from said catalog of voices second voice sound data for the voice of said second character speaking the verbal expression that follows next in the selected branch of the dialog;

(i) generating a video signal representing an image of said second character for display on said video screen while said first character is off-screen;

(j) generating an audio signal from said second voice sound data representing the voice of said second character;

(k) displaying on a second hand-held controller apparatus a second set of alternatively selectable verbal expressions that follows next for said second character in the selected branch of the dialog;

(l) receiving from said second hand-held controller a manually initiated signal representing a second selected verbal expression in said second set of verbal expressions, thereby selecting a next branch in the dialog;

(m) digitally reading from said catalog of voices third voice sound data that corresponds to said second selected verbal expression for the voice of said second character; and (n) generating an audio signal from said third voice sound data representing the voice of said second character speaking said second selected verbal expression.

* * * * *